Figure 1:
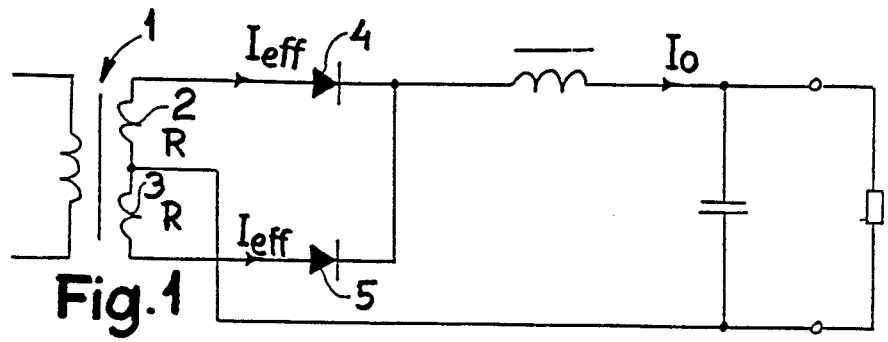

United States Patent [19]

Seiersen

[11] Patent Number: 4,899,271
[45] Date of Patent: Feb. 6, 1990

[54] POWER SUPPLY CIRCUIT

[75] Inventor: Ole S. Seiersen, Horsholm, Denmark

[73] Assignee: Scanpower, Horsholm, Denmark

[21] Appl. No.: 222,207

[22] Filed: Jul. 21, 1988

[30] Foreign Application Priority Data

Jul. 22, 1987 [DK] Denmark .............................. 3826/87

[51] Int. Cl.$^4$ ............................................ H02M 7/06
[52] U.S. Cl. ..................................... 363/126; 363/82; 363/90
[58] Field of Search ..................................... 363/44–48, 363/82, 90, 91, 126

[56] References Cited

U.S. PATENT DOCUMENTS 1,758,680  5/1930  André ..................................... 363/47
3,225,283  12/1965  Kurimura et al. ..................... 363/48

FOREIGN PATENT DOCUMENTS 775843  10/1980  U.S.S.R. .
920995  4/1982  U.S.S.R. .

Primary Examiner—Peter S. Wong
Attorney, Agent, or Firm—Willian, Brinks, Olds, Hofer, Gilson & Lione

[57] ABSTRACT

A power supply circuit comprising a transformer and rectifier diodes, where the ends of the secondary winding are connected to uniform first electrodes of a pair of rectifier diodes (D1, D2) whose second electrodes are connected to one output terminal (−) of the power supply circuit. According to the invention, also reactive components are provided, said reactive components being connected between the other output terminal (+) of the power supply circuit and the first electrode of respective ones of the rectifier diodes. When one reactance (e.g. L2) can send current ($I_{L2}$) through one (D2) rectifier diode serving as an idler diode, while the secondary winding of the transformer draws current ($I_{L1}$) through the same rectifier diode, a better utilization of the transformer is obtained than in the prior art, in particular when the output voltage is relatively low, while the output current is relatively high.

3 Claims, 3 Drawing Sheets

PRIOR ART

POWER SUPPLY CIRCUIT

The invention concern a power supply circuit comprising a transformer whose secondary winding ends are connected to uniform, first electrodes of a pair of rectifier diodes, whose second electrodes are connected to one output terminal of the power supply circuit.

In power supply circuits intended to produce great currents at relatively low voltages, a rectifier coupling is generally used, consisting of two rectifier diodes and a transformer secondary having a central tap. However, this coupling involves a significantly higher copper loss in the secondary of the transformer than is the case with another known type of power supply circuits using a secondary winding without a central tap and four bridge-coupled rectifier diodes. In the bridge-coupled rectifier, however, the load current always runs through two diodes coupled in series, which in combination involve a voltage loss of about 1 volt. Accordingly, in a power supply for computers where the supply voltage is typically 5 volts, the use of the bridge-coupled rectifier type is excluded because almost 20% of the total effect would otherwise be lost in the rectifier diodes. This means that the optimum utilization of the transformer can typically be achieved only at high supply voltages where the two diode voltage drops of the bridge coupling will be less important.

Optimum utilization of the transformer and in particular its secondary winding is of great importance to future power supplies where the use of extreme conversion frequencies (up to the MHz region) is otherwise rapidly limited by secondary parameters, such as stray inductance, skin effect in the windings, as well as purely mechanical problems in connection with passing great line cross-sections out from a physically very small core.

The object of the invention is to provide a power supply circuit which results in the same optimum utilization of the transformer as is the case with the bridge-coupled rectifier, but where the effect loss in the rectifier diodes is reduced to the same level as for the rectifier coupling with central taps.

This object is achieved in that the circuit is formed with two reactive components in addition to the secondary winding and that the first electrodes of the diodes are moreover connected to the second output terminal of the power supply circuit via a respective one of the reactive components. Then, the secondary winding of the transformer can draw current through one of the diodes via one reactive component, while the other reactive component can draw current through the same diode, but in bypass of the secondary winding of the transformer so that both currents contribute to the output current. Although the number of turns of the secondary is of the same order as the known power supply circuit having central taps, the copper losses are nevertheless not greater than is the case with the bridge-coupled rectifier because the secondary of the invention is only transversed by half the current intensity. The other half of the current is supplied by the "idling" reactive component, and it is essential to note that this mode of operation is possible with just a single diode voltage drop.

Derwent's abstract No. H8608 D/34, SU 775 843 discloses a power supply circuit which has similarities with the invention, but which can only produce an output voltage corresponding to a diode voltage drop. Since the output current passes a diode, just as much effect will be lost in the last-mentioned diode by this technique as is possible to deposit in the load, so that this prior art is uninteresting in practice. With respect to this known circuit, the invention may be said to consist in the finding that a specific part of this known circuit per se involves a surprising technical effect, which will be explained more fully in the following description.

In addition to the mentioned components, the power supply circuit of the invention may contain additional ripple filtrating components. The reactive components may be formed with a common magnet core, thereby saving core materials without noticeable coupling between the reactive components. That is, the circuit of the present invention is adapted such that the coupling between the reactive components is insignificant in practice.

The reactance of the reactive components is adapted to the frequency of the source of effect and the load current. If the load current can be much smaller than the nominal value, it may happen that the reactive components return a certain amount of energy to the primary side of the transformer. This may be accepted if the transformer signal is produced by means of a so-called resonance converter coupling, which may typically be frequency modulated. The said reflection energy, however, may be obviated by using so-called non-linear reactive components whose reactance increases rapidly at relatively small load currents.

Figure 2:
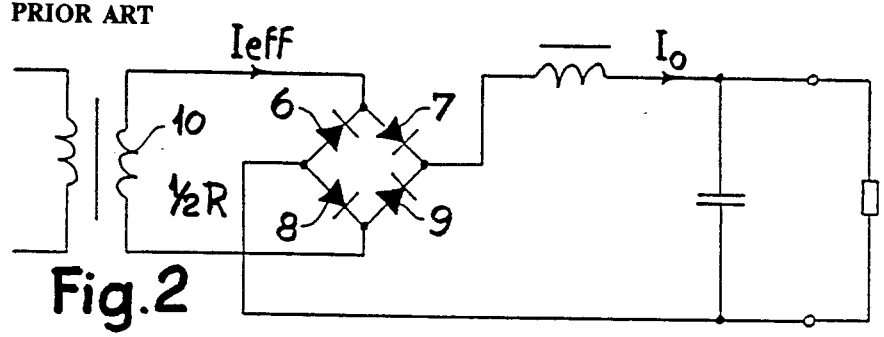
Figure 3:
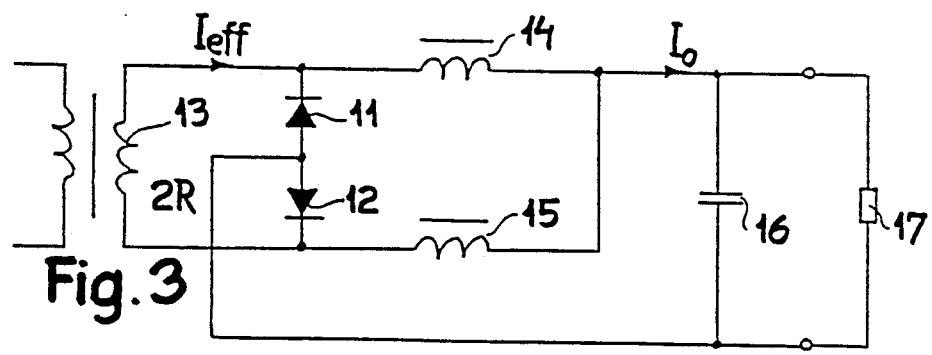
Figure 4:
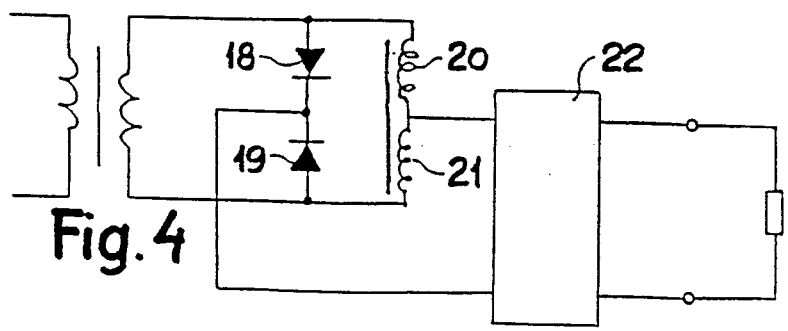
Figure 5A:
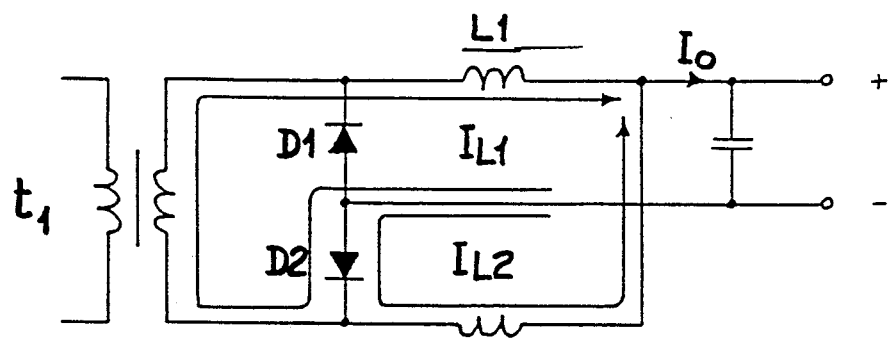
Figure 5B:
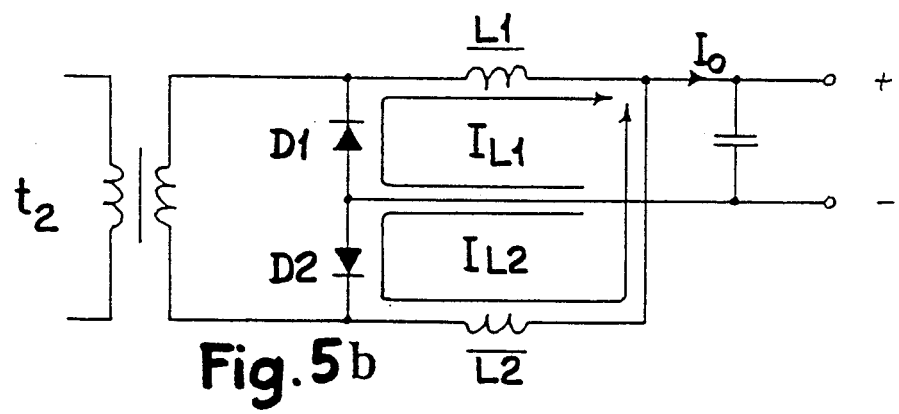
Figure 5C:
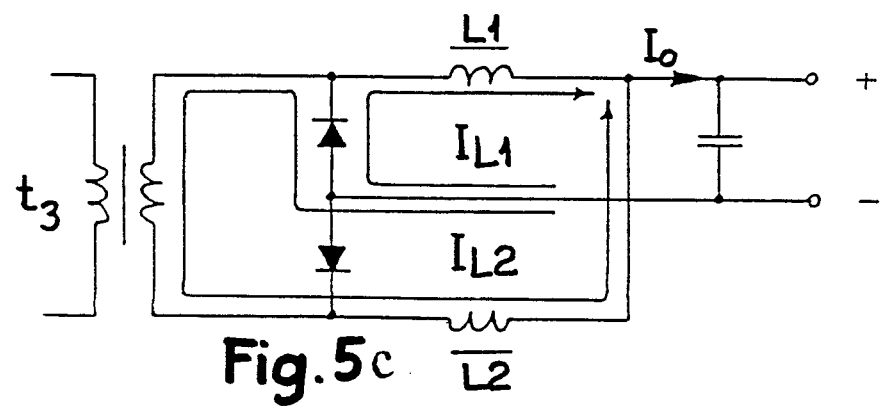
Figure 6:
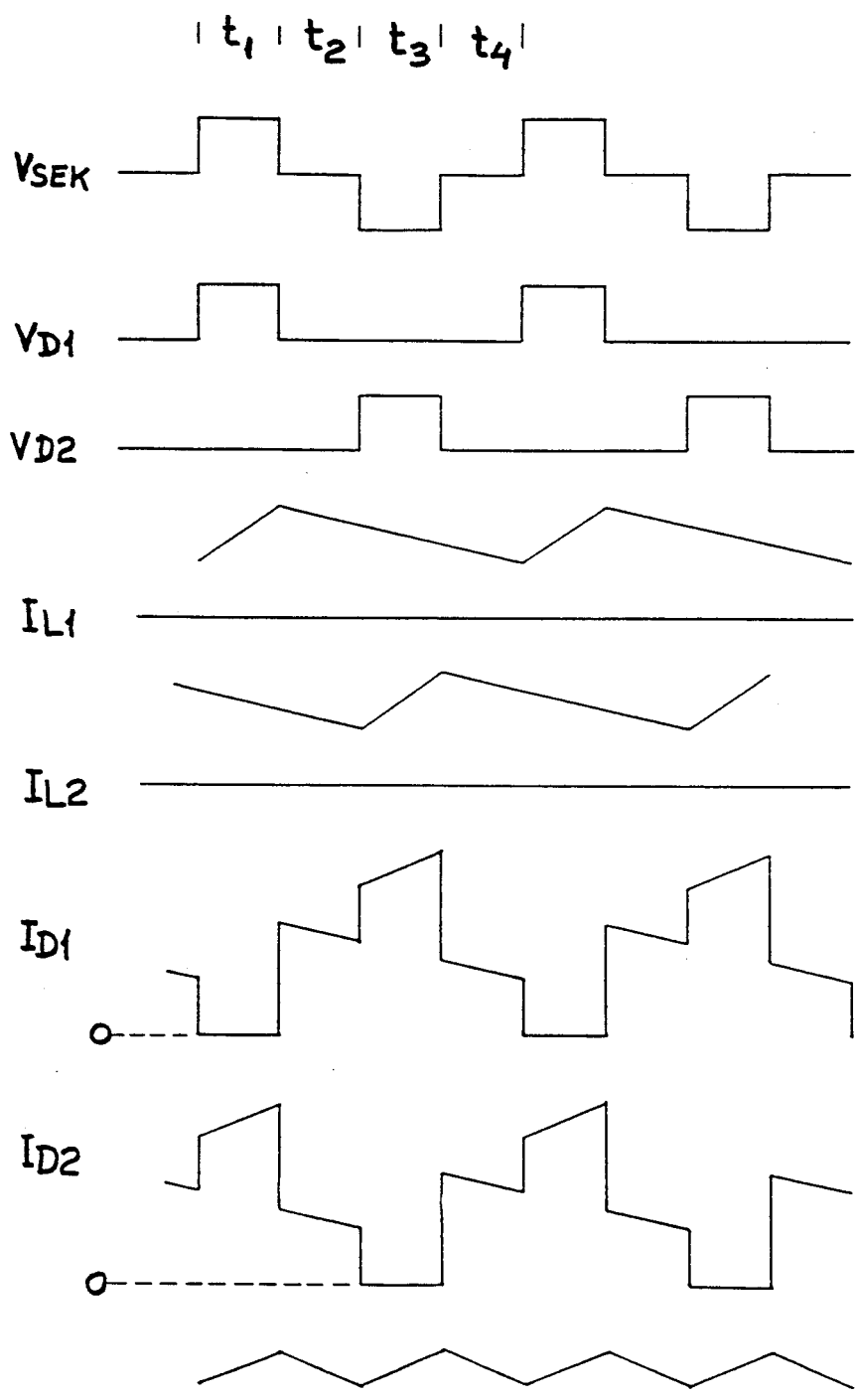

The invention will be explained more fully by the following description of some embodiments with reference to the drawing, in which FIG. 1 shows a known power supply circuit having central taps, FIG. 2 shows a known power supply circuit having bridgecoupled rectifier diodes, FIG. 3 shows embodiment of the circuit of the invention, FIG. 4 shows another embodiment of the circuit of the invention, FIGS. 5a–5c shows the circuit of FIG. 3 in three different states of operation, while FIG. 6 shows the signal forms in the circuit shown in FIG. 5.

Initially, the effect losses in the secondary winding of the transformer and the diodes will be explained.

In the known power supply circuit having central taps shown in FIG. 1, the two secondary windings 2, 3 of the transformer 1 are only loaded in half the period time, so that the effective current intensity will be $$I_{eff} = I_o \times \sqrt{0.5}$$

where $I_o$ is the load current. The copper loss in the entire secondary winding will therefore be $$P_{tab} = 2 \times I_{eff}^2 \times R = I_o^2 \times R$$

where R is the resistance in each of the serially connected windings. The current just runs through one of the diodes 4, 5 at a time, so that the loss of effect just corresponds to a single diode voltage drop.

In the power supply circuit having bridge-coupled rectifier diodes 6–9 shown in FIG. 2, the secondary windings from FIG. 1 may be said to be coupled in parallel. Therefore, the secondary winding 10 in FIG. 2 just exhibits half the resistance (½ R), but now carries current of alternating polarity, so that $$I_{eff} = I_o$$

and the copper loss will then be $$P_{tab} = I^2_{eff} \times \tfrac{1}{2}R = \tfrac{1}{2}I_o^2 \times R$$

i.e. half of the losses in the circuit shown in FIG. 1. However, the current in the bridge-coupling now have to pass two diodes so that twice as much effect is lost in the diodes in the circuit of FIG. 2 than in the circuit of FIG. 1.

FIG. 3 shows a first embodiment of the power supply circuit of the invention, it being noted that, in addition to be connected to the secondary winding 13 of the transformer, the diodes 11, 12 are also connected to the positive output terminal of the power supply via a respective reactive component in the form of two choke coils 14, 15. Preferably, also a smoothing condenser 16 is provided, and the reference numeral 17 represents a load. As will appear from the following, only half the current intensity runs through the secondary winding 13 of the transformer, which will then have to have the double number of turns to produce the necessary secondary voltage, so that the resistance of the secondary winding will be 2R in comparison with the circuits shown in FIGS. 1 and 2.

Since the effective value is $$I_{eff} = \tfrac{1}{2}I_o$$

the loss in the secondary winding 13 will be $$P_{tab} = I_{eff}^2 \times 2R = (\tfrac{1}{2}I_o)^2 \times 2R = \tfrac{1}{2}I_o^2 \times R$$

that is the same as the copper losses in the bridge-coupled rectifier in FIG. 2. The surprising feature is now that this low copper loss may be obtained while effect is just lost in a single diode (the mode of operation will be explained more fully in connection with FIGS. 5a–5c and 6).

FIG. 4 shows some modifications of the circuit shown in FIG. 3. First, it will be seen that the diodes 18, 19 face oppositely to the diodes from FIG. 3, which does not change the mode of operation of the circuit. The reactive components 20 and 21 are shown with a common iron core, which may typically be of the E type where the coils are wound around the outer legs of the E. The circuit 22 represents any form of additional smoothing filter, compensation circuits, etc.

With reference to FIGS. 5a–5c and 6, the mode of operation of the circuit of the invention will now be described in more detail, where FIGS. 5a–5c shows the embodiment of FIG. 4, just drawn slightly different. The example used is the secondary voltage $V_{sec}$ with the dead periods $t_2$ and $t_4$ shown in FIG. 6. In the time period $t_1$, the positive secondary voltage will force the diode D1 to block so that the current $I_{L1}$ is forced to run through the diode D2 and the secondary winding of the transformer. At the same time the reactive component L2 will "idle" and generate the current $I_{L2}$ which also runs through the diode D2. The total current $I_o$ is thus equal to the sum of the currents through the diode D2.

In the dead period $t_2$, no secondary voltage is induced over the transformer and the reactive components L1 and L2 will therefore release their energy so that both diodes can serve as idle diodes in this state. This appears clearly from FIG. 5b and from the signal forms shown in FIG. 6.

When the transformer in the time $t_3$ produces a negative voltage, the diode D2 will be blocked by this voltage, so that the transformer current runs through the diode D1 and contributes partly to the load current $I_o$ and partly to storing of energy in the reactive component L2. The reactive component L1 will continue the idling which took place in the time $t_2$, cf. the curves shown in FIG. 6.

In the time $t_4$, the current corresponds to what appears from FIG. 5 in the time $t_2$.

If the transformer signal is in the form of a square signal, i.e. without the dead periods $t_2$ and $t_4$, the operation states will change between the situations shown for $t_1$ and $t_3$ in FIGS. 5a–5c. Thus, it will be sen that the secondary winding of the transformer never carries more than half the load current since the other half is generated by the reactive components. On the other hand, a greater voltage has to be generated over the secondary of the transformer to make it possible both to pass current to the load and to pass energy into the reactive components, which corresponds to the ohmic resistance of the secondary winding being set at 2R in FIG. 3.

In consequence of the reactive components L1 and L2 being "charged" by the load current, problems may occur if the load current becomes very low. However, this may be compensated for by using non-linear reactive components, e.g. of the type where the core contains an air gap which is magnetically short-circuited over a small portion of the cross-sectional area. Then the self-inductance increases considerably when the load current diminishes so that the reactive components may be charged also by small load currents while maintaining an even current through the reactive components.

I claim:

1. A power supply circuit comprising a transformer including a secondary winding having two secondary winding ends, and a pair of rectifier diodes each diode having a first type of electrode and a second type of electrode, each of the diodes having a first type of its electrodes connected directly to a respective one of the secondary winding ends, the second electrode of each of the diodes being connected to a first output terminal of the power supply circuit, characterized in that the power supply circuit further comprises two reactive components wherein the first type electrodes of the diodes are further connected to the second output terminal of the power supply circuit via a respective one of the reactive components such that the sum of the current through the diodes is substantially equal to the output current, and that the reactive components are dimensioned such that one reactive component sends current through one diode serving as a freewheeling diode, while the secondary winding of the transformer sends current through the same diode.

2. A circuit according to claim 1, wherein the reactive components comprise a common magnet core so adapted that the magnetic coupling between the reactive components is insignificant in practice.

3. A circuit according to claim 1 or 2, characterized in that the reactive components are of the non-linear type, where the self-induction increases when the current intensity diminishes.

* * * * *

UNITED STATES PATENT AND TRADEMARK OFFICE
CERTIFICATE OF CORRECTION

PATENT NO.  : 4,899,271

DATED       : February 6, 1990

INVENTOR(S) : Ole S. Seiersen

It is certified that error appears in the above-identified patent and that said Letters Patent is hereby corrected as shown below:

In column 2, line 36, please delete "bridgecoupled" and substitute therefor --bridge-coupled--.

In column 3, line 9, please delete "current" and substitute therefor --currents--.

In column 4, line 1, please delete "56" and substitute therefor --5b--.

In column 4, line 12, please delete "5" and substitute therefor --5b--.

Signed and Sealed this

Eleventh Day of August, 1992

*Attest:*

DOUGLAS B. COMER

*Attesting Officer*     Acting Commissioner of Patents and Trademarks